(12) United States Patent
Ureche et al.

(10) Patent No.: US 8,838,981 B2
(45) Date of Patent: *Sep. 16, 2014

(54) COMMUNICATION CHANNEL ACCESS BASED ON CHANNEL IDENTIFIER AND USE POLICY

(75) Inventors: Octavian T. Ureche, Renton, WA (US); Alex M. Semenko, Issaquah, WA (US); Sai Vinayak, Redmond, WA (US); Carl M. Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,612

(22) Filed: Sep. 13, 2012

(65) Prior Publication Data

US 2013/0007463 A1  Jan. 3, 2013

Related U.S. Application Data

(63) Continuation of application No. 12/372,476, filed on Feb. 17, 2009, now Pat. No. 8,296,564.

(51) Int. Cl.
*H04L 9/32* (2006.01)
*G06F 17/00* (2006.01)
*H04L 29/06* (2006.01)

(52) U.S. Cl.
CPC ............ *H04L 9/3247* (2013.01); *H04L 63/126* (2013.01); *H04L 63/102* (2013.01)
USPC .............................................. 713/176; 726/1

(58) Field of Classification Search
USPC .............................................. 713/176; 726/1
See application file for complete search history.

(56) References Cited

U.S. PATENT DOCUMENTS

| 7,028,185 B2 | 4/2006 | Wheeler et al. |
| 7,509,250 B2 | 3/2009 | Cruzado |
| 7,516,495 B2 | 4/2009 | Shoemaker |

(Continued)

FOREIGN PATENT DOCUMENTS

| CN | 1695339 | 11/2005 |
| CN | 101425902 | 5/2009 |
| KR | 1020070015671 | 2/2007 |
| WO | WO-2005054973 | 6/2005 |

OTHER PUBLICATIONS

"Non-Final Office Action", U.S. Appl. No. 12/506,568, (Dec. 19, 2012), 20 pages.

(Continued)

*Primary Examiner* — Teshome Hailu
(74) *Attorney, Agent, or Firm* — Tony Azure; Andrew Sanders; Micky Minhas

(57) ABSTRACT

A communication channel has an associated channel authenticator that includes a channel identifier, a use policy identifying how an owner of the communication channel indicates the communication channel is used, and a digital signature over the channel identifier and use policy. The identifier of the communication channel and the use policy can be verified by a computing device, and a check made as to whether a current security policy of the computing device is satisfied by the use policy. An access that the computing device is allowed to have to the communication channel is determined based at least in part on both whether the current security policy is satisfied by the use policy and whether the identifier of the communication channel and the use policy are verified.

20 Claims, 6 Drawing Sheets

(56) References Cited

U.S. PATENT DOCUMENTS

| | | | |
|---|---|---|---|
| 7,624,242 B2 | 11/2009 | Savagaonkar et al. | |
| 8,131,646 B2* | 3/2012 | Kocher et al. | 705/54 |
| 8,296,564 B2 | 10/2012 | Ureche et al. | |
| 2003/0177389 A1 | 9/2003 | Albert et al. | |
| 2005/0005116 A1 | 1/2005 | Kasi et al. | |
| 2005/0114672 A1 | 5/2005 | Duncan | |
| 2005/0268327 A1* | 12/2005 | Starikov | 726/1 |
| 2006/0059537 A1 | 3/2006 | Alvermann et al. | |
| 2006/0105741 A1* | 5/2006 | Suh et al. | 455/410 |
| 2006/0116208 A1 | 6/2006 | Chen | |
| 2006/0136986 A1 | 6/2006 | Doolittle | |
| 2006/0156380 A1 | 7/2006 | Gladstone et al. | |
| 2006/0250968 A1 | 11/2006 | Hudis et al. | |
| 2007/0143823 A1* | 6/2007 | Olsen et al. | 726/1 |
| 2007/0156694 A1 | 7/2007 | Lim | |
| 2007/0174919 A1* | 7/2007 | Raines et al. | 726/27 |
| 2007/0198853 A1 | 8/2007 | Rees | |
| 2007/0204335 A1 | 8/2007 | Zugenmaier | |
| 2007/0239953 A1 | 10/2007 | Savagaonkar et al. | |
| 2008/0205647 A1 | 8/2008 | Zhang et al. | |
| 2008/0263363 A1 | 10/2008 | Jueneman et al. | |
| 2008/0270787 A1 | 10/2008 | LaCous | |
| 2008/0276302 A1 | 11/2008 | Touboul | |
| 2009/0070593 A1 | 3/2009 | Boshra | |
| 2009/0113202 A1 | 4/2009 | Hidle | |
| 2009/0271586 A1 | 10/2009 | Shaath | |
| 2009/0276534 A1* | 11/2009 | Jevans et al. | 709/229 |
| 2009/0300710 A1* | 12/2009 | Chai et al. | 726/1 |
| 2010/0211792 A1 | 8/2010 | Ureche | |
| 2011/0019820 A1 | 1/2011 | Ureche | |

OTHER PUBLICATIONS

"Foreign Office Action", Chinese Application No. 201080032992.6, (Feb. 25, 2013).

"Control Removable USB Devices to Protect Data", Retrieved from http://www.lumension.com/usb_security.jsp on Dec. 16, 2008., 5 Pages.

"Notice of Allowance", U.S. Appl. No. 12/372,476, (Jul. 13, 2012), 11 pages.

"PCT Search Report and Written Opinion", Application No. PCT/US2010/040732, (Feb. 17, 2011), 8 pages.

"Preventing Data Leaks on On USB Ports", Retrieved from http://www.comnews.com/wp_library/Check%20Point%20USB%20leaks.pdf, (May 7, 2007), 8 Pages.

"Reflex Disknet PRO 4", Retrieved from http://www.checkpoint.com/reflexmagnetics/products/downloads/Reflex_Disknet_Pro_Brochure.pdf, (Aug. 2005), 6 Pages.

"RSA Expands Secure Access to Information with Two- and Three-factor Authentication Technology on Everyday Devices", Retrieved from <http://www.rsa.com/press_release.aspx?id=7747>, (Feb. 5, 2007), 3 pages.

"USB 2.0 Seagate Secure Hardware-Based Full-Disc Encryption Technology", Retrieved from <http:www.maxtor.com/content/data_sheet/en_blackarmor_ds.pdf>, (Nov. 2008), 2 pages.

James, Mike "Stop the Drain", Retrieved from: <http://www.server-management.co.uk/features/112> on Dec. 16, 2008., (Jan. 4, 2006), 4 Pages.

Piscitello, Dave "Security and USB Ports: Yet Another Access to Control", Retrieved from: <http://www.securityskeptic.com/usbaccesscontrol.htm> on Dec. 16, 2008, Core Competence, Inc.,(Aug. 25, 2004), 5 Pages.

Posey, Brien M., "Prevent Removable Device Usage with Group Policy Settings", Retrieved from: <http://searchenterprisedesktop.techtarget.com/tip/0,289483,sid192_gci1261751,00.html> on Dec. 16, 2008., (Jun. 21, 2007), 3 Pages.

Posey, Brien M., "Secure Removable Storage Devices via Group Policy in Vista", Retrieved from: <http://searchenterprisedesktop.techtarget.com/tip/0,289483,sid192_gci1257566,00.html> on Dec. 16, 2008, (May 31, 2007), 4 Pages.

Ravi, Nishkam et al., "Towards Securing Pocket Hard Drives and Portable Personalities", *IBM T.J. Watson Research Center*, Available at <http://paul.rutgers.edu/~nravi/securesoul.pdf>,(Oct. 2007), 6 pages.

Tharp, Tom "The Unique Benefits and Risks of USB Mass Storage Devices", Retrieved from http://www.itgi.org/Template.cfm?Section=Home&CCONTENTID=35912&TEMPLATE=/ContentManagement/ContentDisplay.cfm on Dec. 16, 2008., (2007), 3 Pages.

"Foreign Office Action", CN Application No. 201080032992.6, (Sep. 4, 2013), 5 Pages.

"Non-Final Office Action", U.S. Appl. No. 12/506,568, (Oct. 31, 2013),17 pages.

"Foreign Office Action", CN Application No. 201080032992.6, Jan. 22, 2014, 10 pages.

"Final Office Action", U.S. Appl. No. 12/506,568, Jun. 11, 2014, 19 pages.

"Foreign Office Action", CN Application No. 201080032992.6, May 14, 2014, 10 Pages.

"Notice of Allowance", U.S. Appl. No. 12/506,568, Aug. 1, 2014, 6 pages.

* cited by examiner

COMMUNICATION CHANNEL ACCESS BASED ON CHANNEL IDENTIFIER AND USE POLICY

RELATED APPLICATIONS

This application is a continuation of U.S. patent application Ser. No. 12/372,476, filed Feb. 17, 2009, entitled "Communication Channel Access Based On Channel Identifier And Use Policy", which is hereby incorporated by reference herein in its entirety.

BACKGROUND

As computer technology has advanced and computers have become increasingly commonplace, the amount of data transferred electronically has also increased. While such transfers are typically quick and easy, problems with electronically transferring data remain. One such problem is that it is oftentimes very easy for a user to accidentally transfer data from one computer to another. Such accidental transfers can have significant negative consequences, as they can result in confidential information being unintentionally transferred to computers where the information should not be available.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an identifier of a communication channel and a use policy identifying how an owner of the communication channel indicates the communication channel is used are obtained. A digital signature over the identifier and the use policy is generated using a private key of a public/private key pair of the owner, and the identifier, the use policy, and the digital signature are associated with the communication channel.

In accordance with one or more aspects, an identifier of a communication channel and a use policy identifying how an owner of the communication channel indicates the communication channel is used are retrieved from a communication channel authenticator. The identifier of the communication channel and the use policy are verified, and a check made as to whether a current security policy of the computing device is satisfied by the use policy. An access that the computing device is allowed to have to the communication channel is determined based at least in part on both whether the current security policy is satisfied by the use policy and whether the identifier of the communication channel and the use policy are verified.

In accordance with one or more embodiments, a first identifier of a removable storage device and a second identifier of an entity that originated protection of the removable storage device are obtained from an authenticator of the removable storage device. A digital signature over the first identifier and the second identifier is verified to confirm that the first identifier and the second identifier have not been changed since the digital signature was generated. A check is also made as to whether the entity that enabled protection of the removable storage device is a same entity as implements a security policy protecting the computing device. If the entity that enabled protection of the removable storage device is the same entity as implements the security policy protecting the computing device, then the computing device is allowed read-write access to the removable storage device; otherwise, the computing device is allowed read-only access to the removable storage device.

BRIEF DESCRIPTION OF THE DRAWINGS

The same numbers are used throughout the drawings to reference like features.

DETAILED DESCRIPTION

Communication channel access based on channel identifier and use policy is discussed herein. A communication channel, such as a removable storage device, is associated with both an identifier of the communication channel and a use policy identifying how an owner of the communication channel indicates the communication channel will be used. This identifier and use policy are digitally signed using a private key of a public/private key pair of the owner. A computing device accessing the communication channel can verify the digital signature, and determine the access the computing device will have to the communication channel based at least in part on this verification. The computing device can also compare the use policy to a current security policy of the computing device, and determine the access the computing device will have to the communication channel based at least in part on the result of this comparison.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by comparing a verification value obtained using the public key with the original data, and if the two are the same then be assured that no one has tampered with or altered the data that was digitally signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Figure 1:
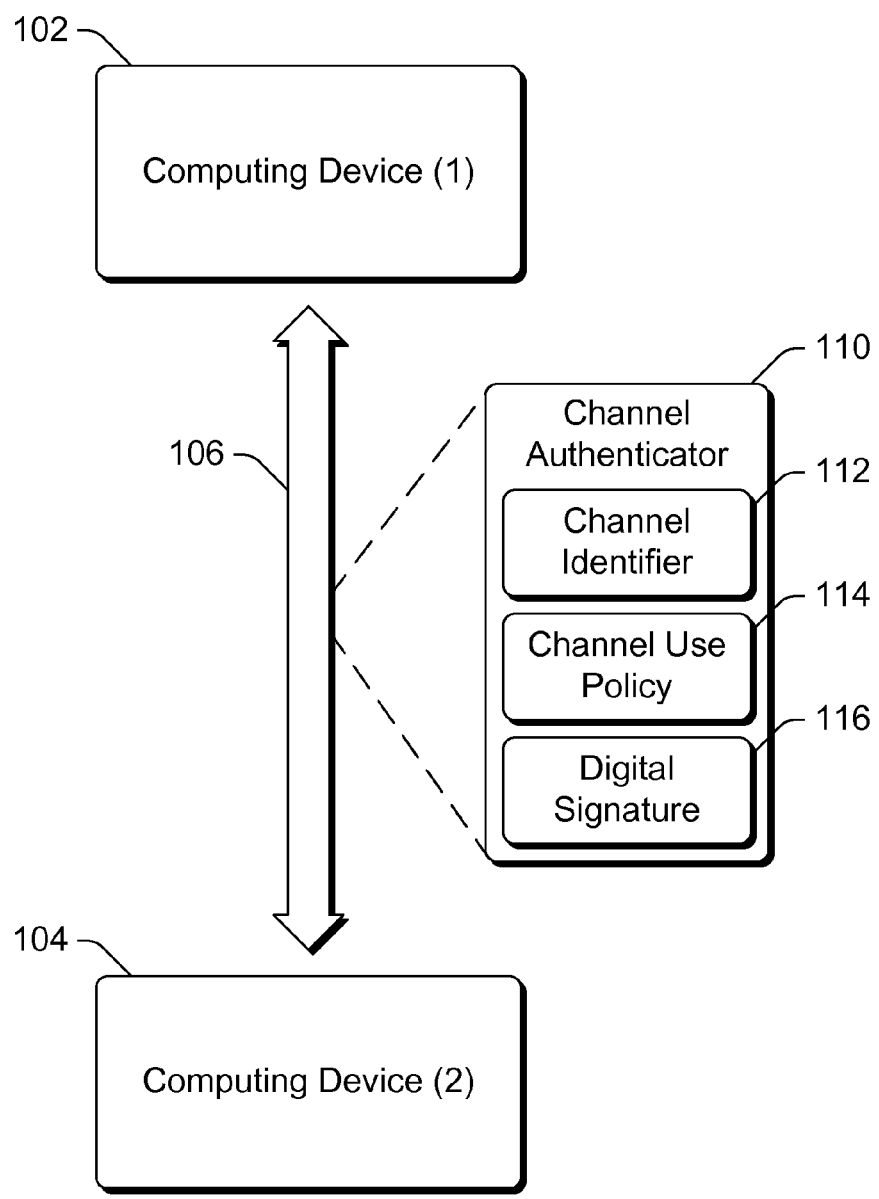
FIG. 1 illustrates an example system implementing the communication channel access based on channel identifier and use policy in accordance with one or more embodiments.

FIG. 1 illustrates an example system 100 implementing the communication channel access based on channel identifier and use policy in accordance with one or more embodiments. System 100 includes computing device 102 and computing device 104, and a communication channel 106 via which data can be communicated between computing devices 102 and 104.

Computing devices 102 and 104 can each be a variety of different types of computing devices. For example, each of computing devices 102 and 104 can be a desktop computer, a mobile station, an entertainment appliance, a set-top box communicatively coupled to a display device, a wireless phone, a game console, an automotive computer, and so forth. Thus, each of computing devices 102 and 104 may range from a full resource device with substantial memory and processor resources (e.g., personal computers, game consoles) to a low-resource device with limited memory and/or processing resources (e.g., traditional set-top boxes, hand-held game consoles). Additionally, each of devices 102 and 104 can be the same type of device or alternatively different types of devices.

Communication channel 106 can be a variety of different types of channels allowing communication between computing devices 102 and 104. In one or more embodiments, communication channel 106 is a removable storage device, such as a flash memory device, a magnetic disk, an optical disc, and so forth. Such a removable storage device can be coupled to computing devices 102 and 104 in a variety of different wired and/or wireless manners. For example, a removable device can be coupled to devices 102 and 104 via a Universal Serial Bus (USB) connection, a wireless USB connection, an IEEE 1394 connection, a Bluetooth connection, and so forth.

In embodiments where communication channel 106 is a removable storage device, such a removable storage device is typically a portable device that can be easily transported to different locations. This portability allows a user to easily move the device and connect the storage device to different computing devices (e.g., devices 102 and 104 of FIG. 1).

In other embodiments, communication channel 106 can take other forms, such as a communication conduit allowing signals or messages to be communicated between computing devices 102 and 104. A variety of different communication protocols can be used to establish such a communication conduit, such as the TLS (Transport Layer Security) protocol, the SSL (Secure Sockets Layer) protocol, other cryptographic or non-cryptographic protocols, and so forth. A communication conduit can be established via various communication links. For example, communication channel 106 can be a communication conduit established via a network such as the Internet, a local area network (LAN), a personal area network, a public telephone network, a cellular or other wireless phone network, and so forth. By way of another example, communication channel 106 can be a communication conduit established using other types of wired and/or wireless links coupling computing device 102 and 104, such as a USB connection, a wireless USB connection, an IEEE 1394 connection, a Bluetooth connection, and so forth.

Associated with communication channel 106 is a channel authenticator 110. Channel authenticator 110 identifies an entity that controls the use policy of communication channel 106. This entity can be an individual, such as an individual owner of a removable storage device, or an individual that is a current user of a computing device 102 or 104 that initiates creation of a communication conduit. This entity can also be an organization, such as a business that owns a removable storage device, a business that owns a computing device 102 or 104 to which a removable storage device is connected, a business that owns a computing device 102 or 104 from which creation of a communication conduit is initiated, a division of such a business, and so forth.

The entity that controls the use policy of communication channel 106 is also typically referred to as the owner of communication channel 106. Alternatively, this entity and the owner can be different entities. For example, the owner can be an individual that purchased a removable storage device that is a communication channel 106, or can be an individual that is a current user of a computing device 102 or 104 that initiates creation of a communication conduit. Continuing this example, the entity that controls the use of communication channel 106, on the other hand, can be a business that owns a computing device 102 or 104 to which the removable storage device is connected, or a business that owns a computing device 102 or 104 from which creation of the communication conduit is initiated.

In embodiments where communication channel 106 is a removable storage device, the data stored on such a removable storage device can be protected by encrypting the storage device using a volume-based or drive-based encryption technique. In a volume-based or drive-based encryption technique, entire volumes and/or drives are encrypted rather than individual files stored on those volumes and/or drives. The encryption is typically performed using symmetric key cryptography to encrypt the data using one or more keys that are accessible only to those that are intended to be able to access the encrypted data. These one or more keys can be obtained in a variety of different manners. For example, the one or more keys can be generated by applying a particular algorithm or function to a password or passphrase entered by a user, or applying a particular algorithm or function to a scan of the user's fingerprint. By way of another example, the one or more keys can be obtained from a smartcard or other device of the user's. In one or more embodiments, the encryption technique employed by such a storage device is the BitLocker™ drive encryption technique available from Microsoft Corporation of Redmond, Wash. Alternatively, other public and/or proprietary encryption techniques can be employed.

It should also be noted that in embodiments where communication channel 106 is a removable storage device, the data stored on such a removable storage device can alternatively be protected using other encryption techniques. For example, the storage device can be encrypted using a file-based encryption technique, such as using EFS (Encrypting File System). Additional information regarding EFS is available from Microsoft Corporation of Redmond, Wash. Alternatively, other public and/or proprietary encryption techniques can be employed.

Channel authenticator 110 includes a channel identifier 112, a channel use policy 114, and a digital signature 116. Channel identifier 112 is an identifier of communication channel 106. Channel identifier 112 can be obtained in a variety of different manners. If channel 106 is a removable storage device, then channel identifier 112 can be an identifier of the removable storage device that is included as part of the storage device when the storage device is created, an identifier that is stored on the storage device when the storage device is first protected, an identifier that is stored on the storage device at other times, and so forth. If channel 106 is a communication conduit, then channel identifier 112 can be an identifier derived from different parameters or characteristics of the communication conduit. For example, channel identifier 112 can be obtained by applying a particular algorithm to one or more encryption keys used as part of the communication conduit, to one or more configuration settings of the communication conduit, and so forth.

Channel use policy 114 identifies how an owner of communication channel 106 indicates communication channel 106 will be used. This use policy 114 in essence is an assertion by the owner of how the owner will use communication channel 106. One or more of a variety of different use indications can be included in channel use policy 114, such as an indication of particular types of devices that channel 106 will be connected to, an indication of particular types of data that will be stored on channel 106, an indication of steps the owner will take to protect the data on channel 106, an indication of the technique employed to protect channel 106, and so forth.

Digital signature 116 is a digital signature over channel identifier 112 and channel use policy 114 using a private key of a public/private key pair of the owner of communication channel 106. Digital signature 116 effectively binds identifier 112 and use policy 114 together. Digital signature 116 also includes an identifier of the owner of communication channel 106, such as a public key of the public/private key pair used to generate digital signature 116.

Channel use policy 114 and digital signature 116 are added to channel authenticator 110 by a device 102 or 104 having a current user that is an owner of the channel 106. This current user could also be an agent of the owner, such as an employee of the owner.

Once generated, channel authenticator 110 can be used by another device to determine what type of access it will allow to data on communication channel 106. In one or more embodiments, a computing device coupled to communication channel 106 checks digital signature 116 to verify that channel identifier 112 and channel use policy 114 have not been altered since digital signature 116 was generated. If they have not been altered since digital signature 116 was generated, then the computing device can trust (to the extent that it trusts the owner that generated digital signature 116) that the identifier 112 and use policy are accurate. After performing this verification, the computing device determines what type of access it will allow to data on channel 106 based on the owner of channel 106 and channel use policy 114.

The computing device can compare the owner of channel 106 to a list or other record of owners to determine a trust level for the owner of channel 106. Different owners can have different trust levels. For example, some owners may be trusted enough so that the computing device trusts use policy 114. By way of another example, other owners may not be trusted so that the computing device does not rely on use policy 114.

The computing device also compares channel use policy 114 to a current security policy of the computing device. The current security policy of the computing device is a policy established by the owner of the computing device, and includes one or more indications of protection or security that is imposed on the computing device. For example, the current security policy could indicate requirements of passwords used to protect access to computing device (e.g., requiring passwords to have a minimum length, or include one or more non-letter symbols), how data is to be encrypted, what resources of the computing device and/or a network a user of the computing device is permitted to access, and so forth. Channel use policy 114 satisfies the current security policy of the computing device if all of the requirements of the current security policy (all of the indications that the current security policy indicates use policy 114 is to have) are met by use policy 114.

By way of example, the current security policy may require that channel 106 be protected using a particular encryption technique and a password of at least 15 characters. If the use policy 114 indicates that that particular encryption technique is used on the channel 106, and that a password of at least 15 characters is used, then the use policy 114 satisfies the current security policy of the computing device. If the use policy 114 does not indicate that that particular encryption is used on the channel 106, or that a password of fewer than 15 characters is used, then the use policy does not satisfy the current security policy of the computing device.

An appropriate access to the channel 106 can then be allowed based on various factors, including whether the digital signature is verified, whether the owner is trusted, and/or whether the use policy satisfies the current security policy of the computing device. The particular access that is appropriate for the computing device to have based on these various factors is identified in the security policy of the computing device. A variety of different types of access control can be permitted and/or prohibited by the security policy of the computing device. By way of example, the particular access could be read-only access for all users (or alternatively only specified users or groups) of the computing device, read-write access for all users (or alternatively only specified users or groups) of the computing device, access to create files for all users (or alternatively only specified users or groups) of the computing device, access to delete files for all users (or alternatively only specified users or groups) of the computing device, and/or any of a variety of other types of access control.

Figure 2:
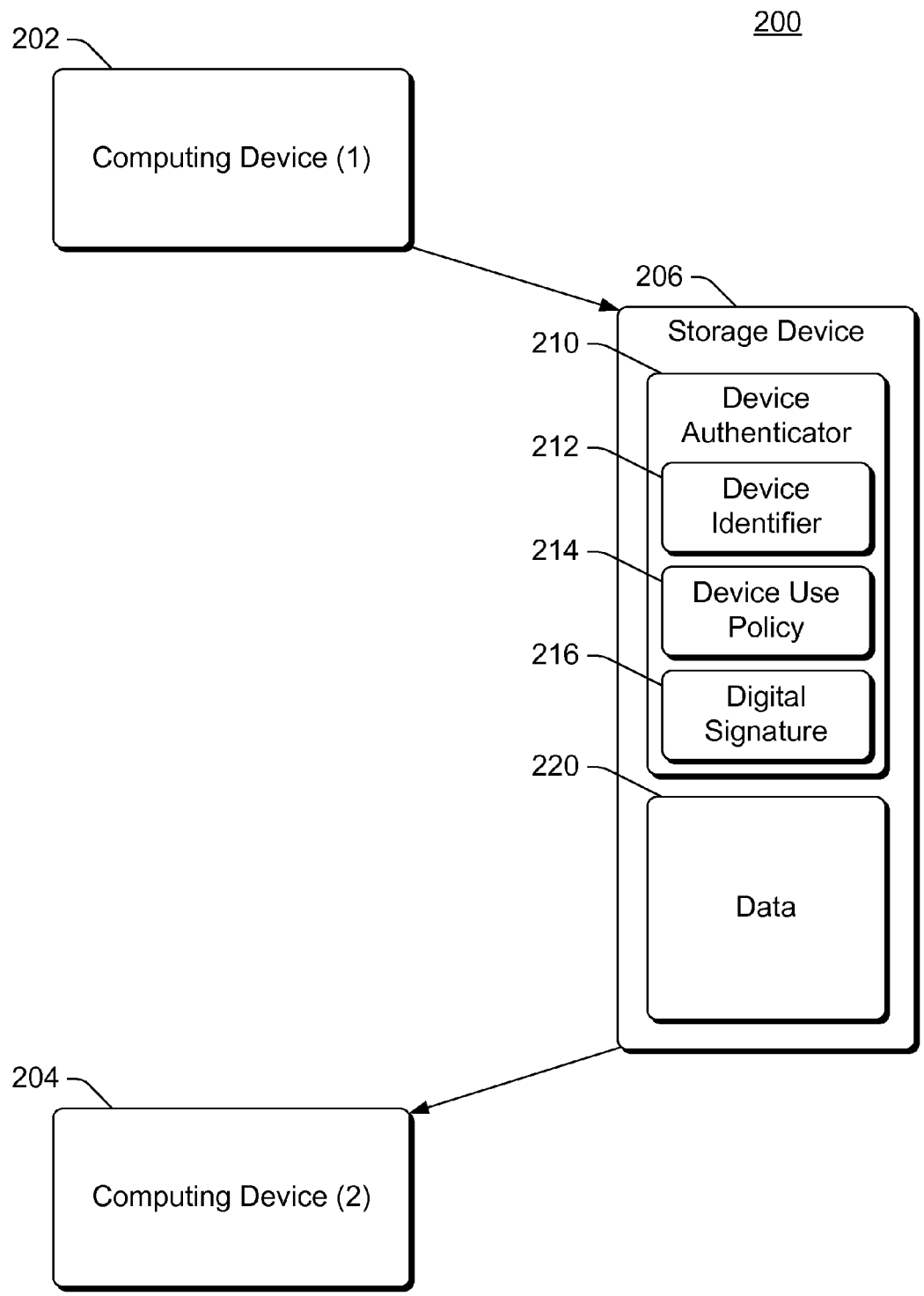
FIG. 2 illustrates an example system implementing the communication channel access based on channel identifier and use policy in accordance with one or more embodiments.

FIG. 2 illustrates an example system 200 implementing the communication channel access based on channel identifier and use policy in accordance with one or more embodiments. System 200 includes computing device 202 and computing device 204, and a communication channel that is a removable storage device 206. Removable storage device 206 can be a variety of different devices as discussed above.

Removable storage device 206 includes a device authenticator 210 and a data portion 220. Device authenticator 210 can be, for example, a channel authenticator 110 of FIG. 1. Device authenticator 210 includes a device identifier 212, a device use policy 214, and a digital signature 216. Device identifier 212 can be, for example, a channel identifier 112 of FIG. 1. Device use policy 214 can be, for example, a channel use policy 114 of FIG. 1. Digital signature 216 can be, for example, a digital signature 116 of FIG. 1.

Computing device 202 stores device use policy 214 and digital signature 216 on storage device 206. In one or more embodiments, device use policy 214 stores an identifier of an entity that originated protection of storage device 206. The entity that originated protection of storage device 206 is the individual that is the current user (or the organization or division thereof that employs the current user) of computing device 202 when storage device 206 is initially protected.

When storage device 206 is connected to computing device 204, the current security policy of computing device 204 indicates that both digital signature 216 and device use policy 214 are to be verified by device 206. Digital signature 216 is verified using the public key included in digital signature 216 to confirm that device identifier 212 and device use policy 214 have not been altered since digital signature 216 was generated.

Computing device 204 verifies device use policy 214 by comparing an identifier of the owner of computing device 204 to the identifier of the entity that originated protection of storage device 206, which is stored in device use policy 214. Analogous to the discussion above regarding communication channel 106 of FIG. 1, the owner of computing device 204 can be an individual or other entity. The owner of computing device 204 is responsible for implementing a security policy to protect computing device 204. Device use policy 214 is verified if the identifier of the owner of computing device 204 and the identifier of the entity that originated protection of storage device 206 are the same.

It should be noted that in verifying the device use policy, situations can arise where two entities need not be identical in order for the entities to be the same. Rather, different entities can be treated as being trusted, with one entity being trusted by another entity and the two entities treated as if they were the same entities. For example, different entities can be different departments or sub-organizations of the same organization. Even though the entities may have different identifiers because they are different departments or sub-organizations, they can be treated as if they were the same entities because they are part of the same organization. By way of another example, various entities can be viewed as trusted even if they are different organizations, one is an individual and another is an organization, and so forth. A record of the different identifiers that can be viewed as equivalent to the identifier of the owner of computing device 204 (e.g., trusted by the owner of computing device 204) can be maintained in different locations. For example, such a record can be included in the security policy protecting computing device 204, can be communicated to computing device 204 by another device, can be stored in another location accessible to computing device 204, and so forth. This record can then be checked, and if the identifier of the entity that originated protection of storage device 206 is the same as an identifier in this record, then device use policy 214 is verified.

If both digital signature 216 and device use policy 214 are verified, then computing device 204 allows itself one type of access (e.g., read-write access) to storage device 206. However, if one or both of digital signature 216 and device use policy 214 are not verified, then computing device 204 allows itself another type of access (e.g., read-only access) to storage device 206.

Thus, in one or more embodiments as can be seen from the example in FIG. 2, a current user of computing device 204 is able to read data from and write data to data portion 220 of storage device 206 only if protection of storage device 206 was originated by the same entity as implements the security policy protecting computing device 204. As these two entities are the same, computing device 204 can be assured storage device 206 was protected using the security policy of the entity implementing the security policy protecting computing device 204. If the entities are not the same, then the current user of computing device is only able to read data from data portion 220. Thus, the current user of computing device 204 is prevented from accidentally writing data to a storage device 206 that was protected by an entity different from the entity implementing the security policy protecting computing device 204. In such a situation, computing device 204 would have read-only access to storage device 206, and thus be prevented from writing data to data portion 220.

It should be noted that various user interfaces can be displayed or otherwise presented to a user of a device to implement the security policy protecting computing device 204. For example, a graphical user interface can be displayed that allows an administrative user to select the security policy for computing device 204. This selection of the security policy can be performed at computing device 204, or alternatively at another device and be communicated to computing device 204. This graphical user interface can also display options allowing the administrative user to select the access that computing device 204 is to have to storage device 206 in different situations (e.g., if the digital signature is or is not verified, if the entity implementing the security policy protecting computing device 204 is or is not a same entity as originated protection of removable storage device 206, and so forth).

Figure 3:
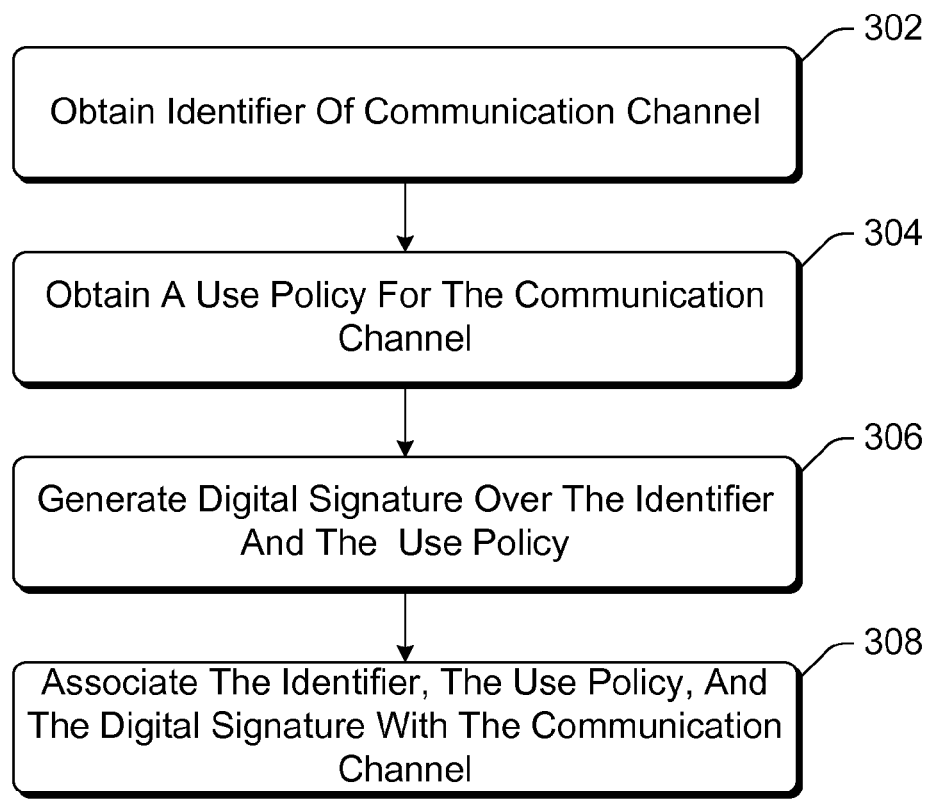
FIG. 3 is a flowchart illustrating an example process for creating a channel authenticator in accordance with one or more embodiments.

FIG. 3 is a flowchart illustrating an example process 300 for creating a channel authenticator in accordance with one or more embodiments. Process 300 is carried out by a computing device, such as computing device 102 or 104 of FIG. 1, or computing device 202 of FIG. 2, and can be implemented in software, firmware, hardware, or combinations thereof. Process 300 is an example process for creating a channel authenticator; additional discussions of creating a channel authenticator are included herein with reference to different figures.

In process 300, an identifier of a communication channel is obtained (act 302). This identifier can be obtained in different manners based on the type of the communication channel as discussed above. For example, this identifier can be an identifier obtained from a removable storage device, an identifier generated based on one or more encryption keys used as part of a communication conduit, and so forth.

A use policy for the communication channel is also obtained (act 304). This use policy can be obtained in a variety of different manners, such as being specified by a current user of the device implementing process 300, being specified by another component or module of the device implementing process 300, being specified by a current security policy of the device implementing process 300, and so forth.

A digital signature is generated over the identifier obtained in act 302 and the use policy obtained in act 304 (act 306). This digital signature is generated using the private key of a public/private key pair of the owner of communication channel 106.

The identifier obtained in act 302, the use policy obtained in act 304, and the digital signature generated in act 306 are associated with the communication channel (act 308). This associating refers to maintaining a correspondence between the communication channel and the identifier, use policy, and digital signature. In one or more embodiments, this associating includes storing the identifier, use policy, and digital signature as a communication channel authenticator associated with the communication channel. The location and manner of storage of the channel authenticator can vary based on the particular communication channel. For example, if the communication channel is a removable storage device, then the channel authenticator can be stored on the removable storage device. By way of another example, if the communication channel is a communication conduit, then the channel authenticator can be stored in a storage device of the computing device implementing process 300.

It is to be appreciated that in some situations one or more of the identifier, use policy, and digital signature is already stored as being associated with the communication channel. In such situations, the information already stored as being associated with the communication channel need not be re-stored as part of the associating in act 308. For example, if the communication channel is a removable storage device on which an identifier of the removable storage device is already stored (e.g., the identifier is obtained from the removable storage device in act 302), then the identifier can be, but need not be, re-stored on the removable storage device as part of act 308.

Figure 4:
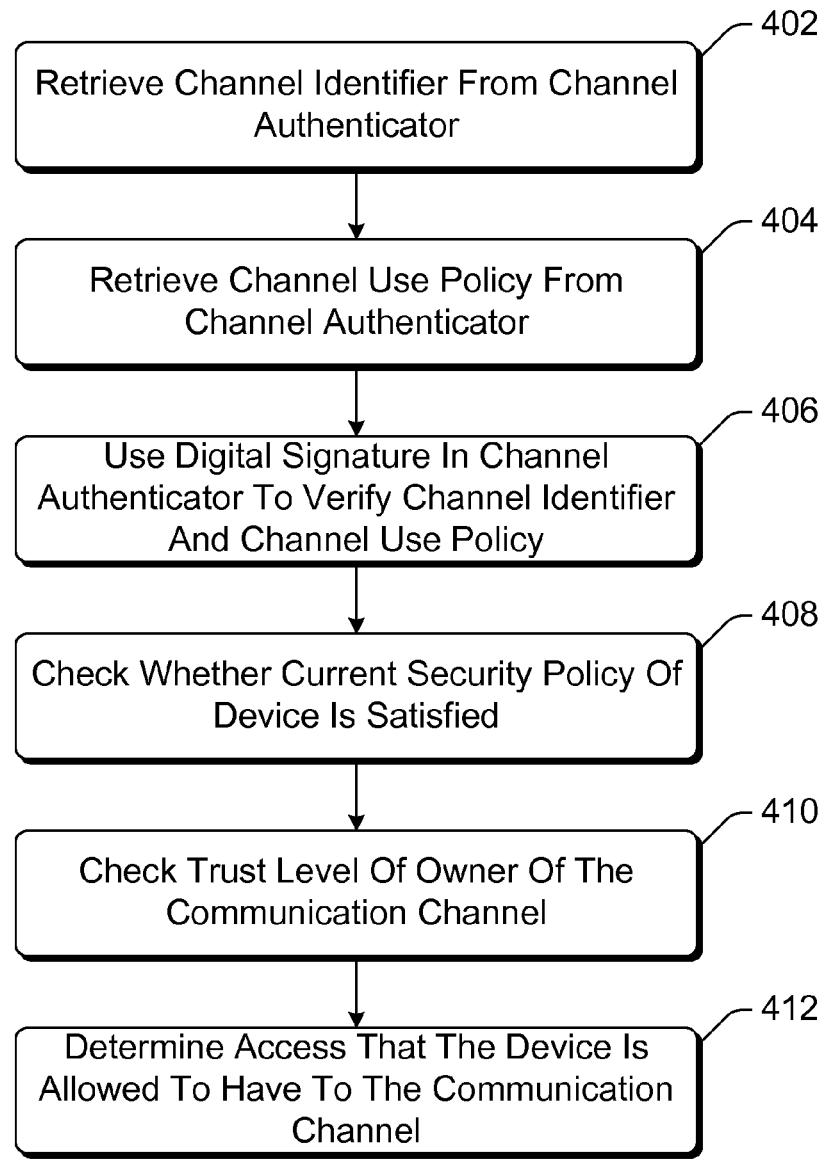
FIG. 4 is a flowchart illustrating an example process for implementing communication channel access based on channel identifier and use policy in accordance with one or more embodiments.

FIG. 4 is a flowchart illustrating an example process 400 for implementing communication channel access based on channel identifier and use policy in accordance with one or more embodiments. Process 400 is carried out by a computing device, such as computing device 102 or 104 of FIG. 1, or computing device 204 of FIG. 2, and can be implemented in software, firmware, hardware, or combinations thereof. Process 400 is an example process for implementing communication channel access based on channel identifier and use policy; additional discussions of implementing communication channel access based on channel identifier and use policy are included herein with reference to different figures.

In process 400, a channel identifier is retrieved from the channel authenticator associated with a communication channel (act 402). A channel use policy is also retrieved from the communication channel (act 404). A digital signature in the channel authenticator is used to verify the channel identifier and channel use policy (act 406).

A check is made as to whether a current security policy of the computing device implementing process 400 is satisfied (act 408). This check can include one or more different checks based on the current security policy, such as checking whether the digital signature is verified, checking whether the channel use policy satisfies the current security policy, and so forth.

A check is also made of the trust level of the owner of the communication channel (act 410). This owner is identified from the digital signature in the channel authenticator, and can be compared to a list or other record of owners as discussed above.

A determination is then made as to the access that the device implementing process 400 is to have to the communication channel (act 412). This determination can be made based on the various checks that are performed in acts 408 and 410. For example, the determination may be made that read-write access to the communication channel is permitted if the digital signature is verified, the owner is trusted, and the use policy satisfies the current security policy of the device. By way of another example, the determination may be made that no access (or read-only access) to the communication channel is permitted if the digital signature is not verified, if the owner is not trusted, and/or the use policy does not satisfy the current security policy of the device. Alternatively, this determination can be a determination of a variety of different types of access as discussed above.

An indication of the access that the device implementing process 400 is to have to the communication channel can also optionally be displayed or otherwise presented to a user of the device implementing process 400. An indication of the reasoning for the access can also optionally be displayed or otherwise presented. For example, a user interface can optionally be displayed to the user indicating that read-only access is permitted to the communication channel. By way of another example, a user interface can optionally be displayed to the user indicating that read-only access is permitted to the communication channel because the use policy does not satisfy the current security policy of the device implementing process 400.

Figure 5:
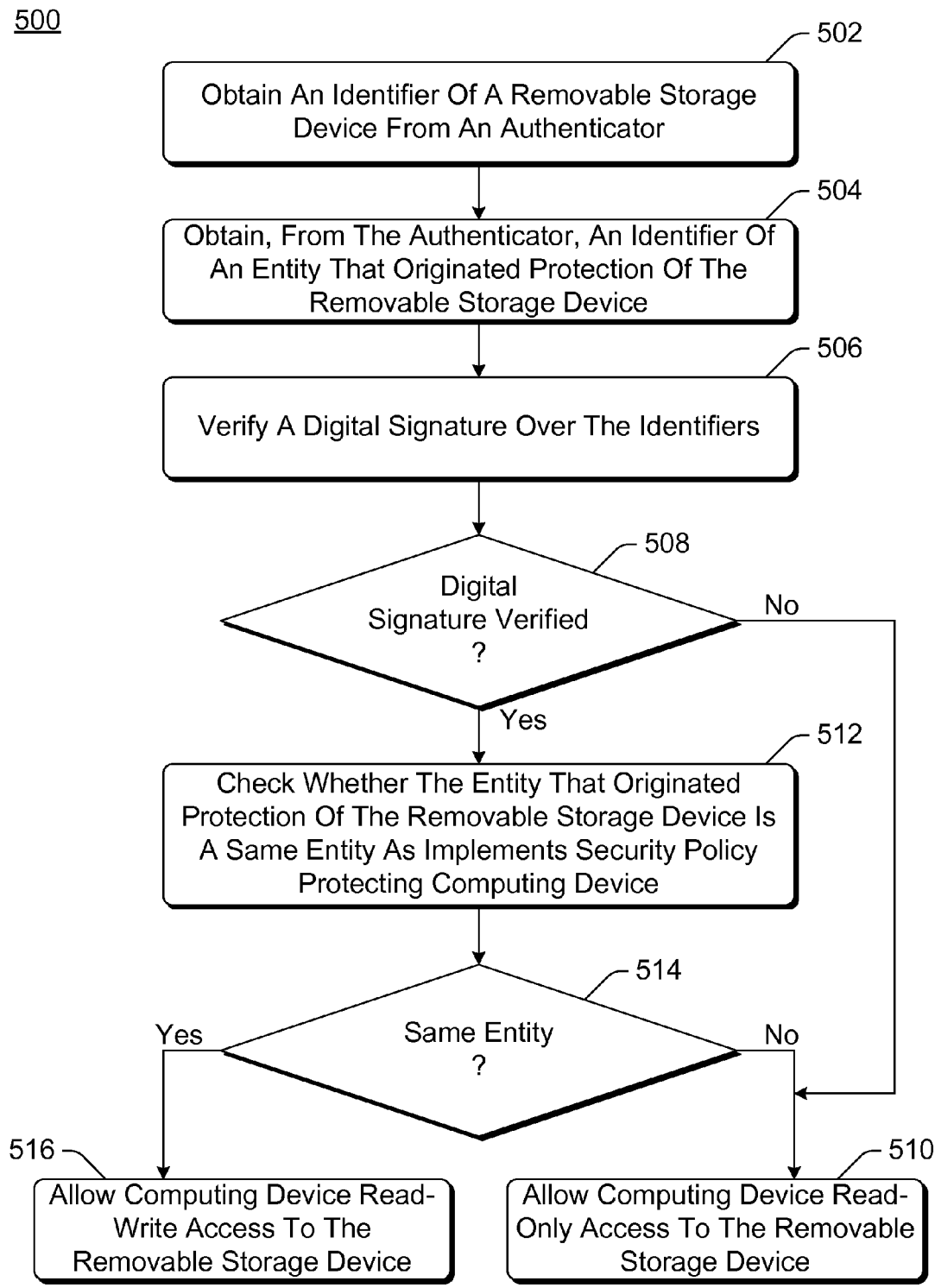
FIG. 5 is a flowchart illustrating an example process for implementing communication channel access based on channel identifier and use policy in accordance with one or more embodiments.

FIG. 5 is a flowchart illustrating an example process 500 for implementing communication channel access based on channel identifier and use policy in accordance with one or more embodiments. Process 500 is carried out by a computing device, such as computing device 102 or 104 of FIG. 1, or computing device 204 of FIG. 2, and can be implemented in software, firmware, hardware, or combinations thereof. Process 500 is an example process for implementing communication channel access based on channel identifier and use policy; additional discussions of implementing communication channel access based on channel identifier and use policy are included herein with reference to different figures.

In process 500, an identifier of a removable storage device is obtained from an authenticator (act 502). An identifier of an entity that originated protection of the removable storage device is also obtained from the authenticator (act 504). This authenticator in process 500 can be, for example, a channel authenticator stored on the removable storage device as discussed above.

A digital signature over the identifiers obtained in acts 502 and 504 is also verified (act 506) to confirm that the identifiers obtained in acts 502 and 504 have not been altered since the digital signature was generated. This verification can be performed using the public key in the digital signature as discussed above. Process 500 then proceeds based on whether the digital signature is verified (act 508). If the digital signature is not verified, then the device implementing process 500 is allowed read-only access to the removable storage device (act 510).

However, if the digital signature is verified, then a check is made as to whether the entity that originated protection of the storage device is a same entity as implements a security policy protecting the device implementing process 500 (act 512). Process 500 then proceeds based on whether the check in act 512 determines that they are the same entity (act 514). If they are not the same entity, then the device implementing process 500 is allowed read-only access to the removable storage device (act 510). However, if they are the same entity, then the device implementing process 500 is allowed read-write access to the removable storage device (act 516).

In act 510, an indication that the computing device implementing process 500 has read-only access to the removable storage device can also optionally be displayed or otherwise presented to a user of the computing device. An indication of the reasoning for the access can also optionally be displayed or otherwise presented to the user. For example, a user interface can optionally be displayed to the user indicating that read-only access is permitted to the removable storage device because the digital signature was not verified, or because the entity that originated protection of the removable storage device is not the same entity as implements the security policy protecting the computing device.

In the example process 500, reference is made to allowing read-only access to the removable storage device (in act 510) or read-write access to the removable storage device (in act 516). It is to be appreciated that read-only access and read-write access are only two examples, and that alternatively a variety of other different types of access control can be applied as discussed above.

Figure 6:
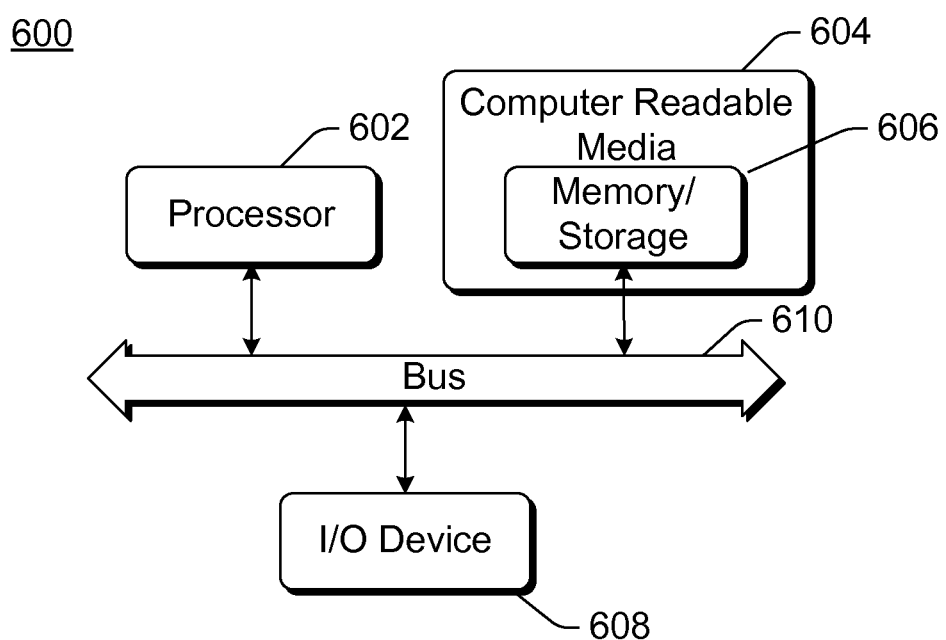
FIG. 6 illustrates an example computing device that can be configured to implement the communication channel access based on channel identifier and use policy in accordance with one or more embodiments.

FIG. 6 illustrates an example computing device 600 that can be configured to implement the communication channel access based on channel identifier and use policy in accordance with one or more embodiments. Computing device 600 can be, for example, a computing device 102 or 104 of FIG. 1, a computing device 202 or 204 of FIG. 2, or a computing device implementing one or more of the techniques discussed herein.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Memory and/or storage components 606 can include, for example, a removable storage device (e.g., a storage device 206 of FIG. 2). Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the storage volume protection supporting legacy systems techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   obtaining an identifier of a communication channel, the communication channel comprising a removable storage device;
   obtaining a use policy identifying an entity that originated protection of the communication channel as well as how an owner of the communication channel indicates the communication channel is used including techniques employed to protect data stored on the removable storage device, the techniques including how the data is to be encrypted;
   generating, using a private key of a public/private key pair of the owner of the communication channel, a digital signature over the identifier of the communication channel and the use policy; and
   associating the identifier of the communication channel, the use policy, and the digital signature with the communication channel.

2. A method as recited in claim 1, wherein the use policy further identifies how the owner indicates data stored on the removable storage device will be used and a type of data that is allowed to be stored.

3. A method as recited in claim 1, the associating comprising storing the use policy and the digital signature on the removable storage device.

4. A method as recited in claim 1, the obtaining comprising obtaining the identifier from the communication channel.

5. A method as recited in claim 1, the associating comprising storing the identifier, the use policy, and the digital signature on the communication channel.

6. A method as recited in claim 1, wherein the use policy further includes an indication of particular types of devices that the communication channel will be connected to.

7. A method as recited in claim 1, further comprising verifying the digital signature over the identifier of the communication channel and the use policy has not been changed since the digital signature was generated.

8. A method as recited in claim 7, the verifying being further based at least in part on a trust level that the computing device has for the owner.

9. A method implemented in a computing device, the method comprising:
retrieving, from a communication channel authenticator of a communication channel, an identifier of the communication channel and a use policy identifying how an owner of the communication channel indicates the communication channel is used, the communication channel comprising a removable storage device;
verifying the identifier of the communication channel and the use policy have not been altered;
checking whether a current security policy of the computing device is satisfied by the use policy; and
determining, based at least in part on both whether the current security policy is satisfied by the use policy and whether the identifier of the communication channel and the use policy are verified, an access that the computing device is allowed to have to the communication channel, the determining including allowing read-write access to the communication channel only if an entity that originated protection of the communication channel is a same entity as an entity that implements a security policy protecting the computing device, the entity that originated protection of the removable storage device being identified in the use policy.

10. A method as recited in claim 9, wherein the access is read-only access if one or more of the current security policy is not satisfied, the identifier of the communication channel is not verified, or the use policy is not verified.

11. A method as recited in claim 10, wherein the access is read-write access only if the current security policy is satisfied, the identifier of the communication channel is verified, and the use policy is verified.

12. A method as recited in claim 9, the verifying comprising using a digital signature in the communication channel authenticator to verify that the identifier and the use policy have not been changed since the digital signature was generated.

13. A method as recited in claim 12, the determining being further based at least in part on a trust level that the computing device has for the owner.

14. A method as recited in claim 9, wherein the use policy identifies how the owner indicates data stored on the removable storage device will be used and a type of data that is allowed to be stored.

15. A method as recited in claim 9, wherein the use policy includes an indication of particular types of devices that the communication channel will be connected to.

16. A computing device having stored computer-executable instructions that when executed perform operations comprising:
obtaining, from an authenticator of a removable storage device, a first identifier of the removable storage device;
obtaining, from the authenticator, a second identifier of an entity that originated protection of the removable storage device;
verifying a digital signature over the first identifier and the second identifier to confirm that the first identifier and the second identifier have not been changed since the digital signature was generated;
checking whether the entity that enabled protection of the removable storage device is a same entity as implements a security policy protecting the computing device, the entity that enabled protection of the removable storage device being identified in a use policy obtained from the removable storage device; and
allowing the computing device read-write access to the removable storage device if the entity that enabled protection of the removable storage device is the same entity as implements the security policy protecting the computing device, otherwise allow the computing device read-only access to the removable storage device.

17. A computing device as recited in claim 16, the operations further comprising allowing the computing device to have read-only access to the removable storage device if the digital signature is not verified.

18. A computing device as recited in claim 16, wherein the use policy identifies how the owner indicates data stored on the removable storage device will be used and a type of data that is allowed to be stored.

19. A computing device as recited in claim 16, wherein the use policy identifies how the owner of the communication channel indicates the communication channel will be used, including an indication of particular types of devices that the communication channel will be connected to.

20. A computing device as recited in claim 16, the verifying the digital signature over the first identifier and the second identifier to confirm that the first identifier and the second identifier have not been changed being further based at least in part on a trust level that the computing device has for an owner of the removable storage device.

* * * * *